United States Patent
Brown et al.

(10) Patent No.: US 10,676,003 B2
(45) Date of Patent: Jun. 9, 2020

(54) FIXATION SYSTEM AND METHOD THAT DETECTS PROPER ATTACHMENT

(71) Applicant: GM GLOBAL TECHNOLOGY OPERATIONS LLC, Detroit, MI (US)

(72) Inventors: David L. Brown, White Lake, MI (US); Gregory J. Vargo, Troy, MI (US); Orlando L. Lomo, II, Rochester Hills, MI (US); David M. Kelly, Romeo, MI (US); Leonard C. McLean, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 15/657,805

(22) Filed: Jul. 24, 2017

(65) Prior Publication Data
US 2019/0023165 A1    Jan. 24, 2019

(51) Int. Cl.
| | |
|---|---|
| *B62D 65/14* | (2006.01) |
| *B62D 65/02* | (2006.01) |
| *B62D 65/00* | (2006.01) |
| *B60N 3/02* | (2006.01) |

(52) U.S. Cl.
CPC .......... *B60N 3/026* (2013.01); *B60N 3/023* (2013.01); *B62D 65/005* (2013.01); *B62D 65/024* (2013.01); *B62D 65/14* (2013.01)

(58) Field of Classification Search
CPC .. B62D 65/028; B62D 65/026; B62D 65/024; B62D 65/022; B62D 65/02; B62D 65/005; B62D 65/00; B60N 3/14; B60N 3/026; B60N 3/023; B60N 3/02
See application file for complete search history.

(56) References Cited

U.S. PATENT DOCUMENTS

| | | | | |
|---|---|---|---|---|
| 4,404,709 A | * | 9/1983 | Janz ...................... | B60N 3/026 16/422 |
| 4,925,217 A | * | 5/1990 | Ketcham ............. | F16L 37/0987 285/319 |
| 4,981,322 A | * | 1/1991 | Dowd .................... | B60N 3/023 24/297 |
| 4,981,323 A | * | 1/1991 | Dowd .................... | B60N 3/023 105/354 |
| 5,152,555 A | * | 10/1992 | Szabo ................ | F16L 37/0987 285/305 |

(Continued)

*Primary Examiner* — Jacob J Cigna
(74) *Attorney, Agent, or Firm* — Lorenz & Kopf LLP

(57) ABSTRACT

Methods and apparatus are provided for attaching a first device to a second device. The method includes providing an attachment structure for attaching the first device to the second device that includes a fastener that is movable from a first position to a second position within the attachment structure, moving the first device into position to be attached to the second device with the fastener in the first position, obscuring an attachment detection window with a window barrier fixed to the fastener, securing the first device to the second device by sliding the fastener from the first position to the second position, locking the fastener in the second position, revealing the attachment detection window when the fastener is locked in the second position, and reading the attachment detection window to detect that the first device has been properly attached to the second device.

20 Claims, 4 Drawing Sheets

(56) References Cited

U.S. PATENT DOCUMENTS

| | | | | |
|---|---|---|---|---|
| 5,991,976 A * | 11/1999 | Adams | ............... | B60N 3/026 |
| | | | | 16/110.1 |
| 6,616,222 B1 * | 9/2003 | Ponceau | ............... | B60N 3/023 |
| | | | | 16/445 |
| 7,103,939 B2 * | 9/2006 | Belchine, III | ......... | B60N 3/023 |
| | | | | 16/412 |
| 9,453,523 B2 * | 9/2016 | Maschat | ............... | B60R 21/20 |
| 10,167,983 B2 * | 1/2019 | Tomlinson | ............ | F16L 37/12 |
| 2008/0319570 A1 * | 12/2008 | Van Schoiack | ......... | B23P 19/06 |
| | | | | 700/110 |
| 2016/0068118 A1 * | 3/2016 | Benedetti | ............ | F16B 5/0657 |
| | | | | 24/458 |

* cited by examiner

FIXATION SYSTEM AND METHOD THAT DETECTS PROPER ATTACHMENT

TECHNICAL FIELD

The technical field generally relates to methods for fastening objects together, and more particularly relates to fixation methods that provide an attachment detection indication.

INTRODUCTION

Safety critical components in automotive manufacturing, such as an assist handle, may be attached using a threaded fastener. Torque and angle monitoring may be employed to determine proper assembly. This technique, however, may introduce torque/twist into the assist handle assembly and may be the root cause of assembly issues.

Accordingly, it is desirable to provide a fixation method that does not introduce assembly issues. In addition, it is desirable to provide a fixation method that allows for detection of proper assembly. Furthermore, other desirable features and characteristics of the present invention will become apparent from the subsequent detailed description and the appended claims, taken in conjunction with the accompanying drawings and the foregoing technical field and background.

SUMMARY

A method is provided for attaching a first device to a second device. In one embodiment, the method includes retrieving an attachment structure configured to attach the first device to the second device that includes a fastener that is movable from a first position to a second position within the attachment structure, moving the first device into position to be attached to the second device with the fastener in the first position, wherein a window barrier fixed to the fastener obscures an attachment detection window, securing the first device to the second device by sliding the fastener from the first position to the second position and locking the fastener in the second position, wherein the attachment detection window is revealed when the fastener is locked in the second position, and reading the attachment detection window to detect that the first device has been properly attached to the second device.

The attachment structure may include an opening through which a holding structure on the second device can enter to engage the fastener when attaching the first device to the second device.

The attachment detection window may include a barcode or a color-coded indicator as an attachment detection indicator.

Reading the attachment detection window may include reading an attachment detection indicator in the attachment detection window using a laser scanner.

One or more of the retrieving, moving, sliding, and reading in the method may be performed using computer-controlled manufacturing equipment.

The fastener may include a push-pin having a cylindrical-like shaped body and a head section extending laterally beyond the width of the body, and the window barrier may be fixed to a lateral edge of the head section and angled away from the head section.

The attachment structure may include a passageway through which the fastener may slide and an opening in the passageway through which a holding structure on the second device can enter to engage the fastener when attaching the first device to the second device.

Moving the first device into position to be attached to the second device may include positioning the first device such that a holding structure on the second device fits within an opening in a passageway in the attachment structure through which the fastener may slide.

An attachment system for attaching a first device to a second device is provided. In one embodiment, the attachment system includes an attachment structure for attaching the first device to the second device, an attachment detection window in the attachment structure that includes an attachment detection indicator, a fastener that is slidably movable from a first position to a second position within the attachment structure, and a window barrier fixed to the fastener. The attachment system is configured to allow the first device to be moved into position to attach to the second device when the fastener is positioned in a first position. The attachment system is configured to attach the first device to the second device when the fastener is positioned in a second position. The window barrier obscures the attachment detection indicator when the fastener is not in the second position. The window barrier is positioned to not obscure the attachment detection indicator when the fastener is locked in the second position.

The system may further include a passageway within the attachment structure through which the fastener is slidably movable.

The system may further include an opening in the passageway through which a holding structure on the second device can enter to engage the fastener when the first device is attached to the second device.

The attachment detection indicator may include a barcode.

The attachment detection indicator may include a color-coded indicator.

The fastener may include a push-pin having a cylindrical-like shaped body and a head section extending laterally beyond the width of the body, and the window barrier may be fixed to a lateral edge of the head section and angled away from the head section.

An attachment structure in a vehicle for attaching a handle to an attachment bracket is provided. In one embodiment, the attachment structure includes a bezel on an end of the handle that is rotatably attached to the handle and configured to mount the handle to the vehicle via a bracket, an attachment detection window in the bezel that includes an attachment detection indicator, a fastener that is slidably movable from a first position to a second position within the bezel, and a window barrier fixed to the fastener. The bezel is configured to allow the handle to be moved into position to attach to the bracket when the fastener is positioned in a first position. The bezel is configured to attach the handle to the bracket when the fastener is positioned in a second position. The window barrier obscures the attachment detection indicator when the fastener is not in the second position. The window barrier is positioned to not obscure the attachment detection indicator when the fastener is locked in the second position.

The attachment structure may further include a passageway within the bezel through which the fastener is slidably movable.

The attachment structure may further include an opening in the passageway through which a holding structure on the bracket can enter to engage the fastener when the handle is attached to the bracket.

The attachment detection indicator may include a barcode.

The attachment detection indicator may include a color-coded indicator.

The fastener may include a push-pin having a cylindrical-like shaped body and a head section extending laterally beyond the width of the body, and the window barrier may be fixed to a lateral edge of the head section and angled away from the head section.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, introduction, summary or the following detailed description.

The subject matter described herein discloses apparatus, systems, techniques and articles for attaching one structure to another. The described techniques provide a fixation method that may provide an indication of proper assembly and allow for detection of proper assembly.

Figure 1A:
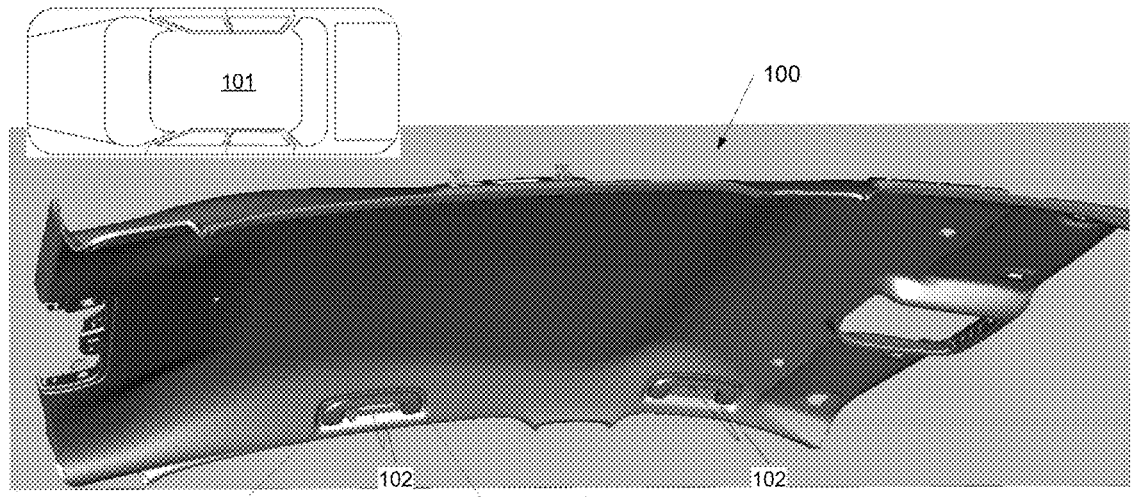
FIG. 1A is a diagram depicting an example headliner for a motor vehicle, in accordance with an embodiment.

FIG. 1A is a diagram depicting an example headliner 100 for a motor vehicle 101. The motor vehicle 101 may comprise an automobile, car, truck, van, bus, or others. The example headliner 100 includes, among other things, a pair of assist handles 102.

Figure 1B:
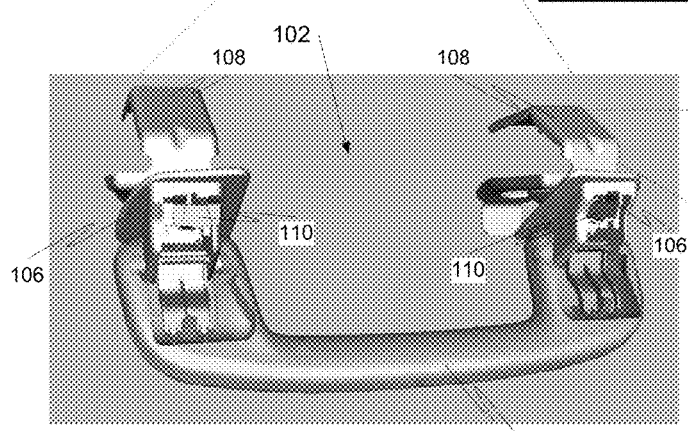
FIG. 1B is a diagram depicting an example assist handle attached to an example pair of assist handle brackets, in accordance with an embodiment.

FIG. 1B is a diagram depicting an example assist handle 102 attached to an example pair of assist handle brackets. The example assist handle 102 includes a handle body 104 and a pair of bezels 106 on each end of the handle body 104. Each example bezel 106 is rotatably attached to the handle body 104 and is configured to mount the assist handle 102 to the headliner 100 via an assist handle bracket 108 that is configured to be fixed (e.g., welded) to the body of the vehicle 101. The example bezel 106 is configured to be secured to the example assist handle bracket 108 via a fastener 110.

Figure 1C:
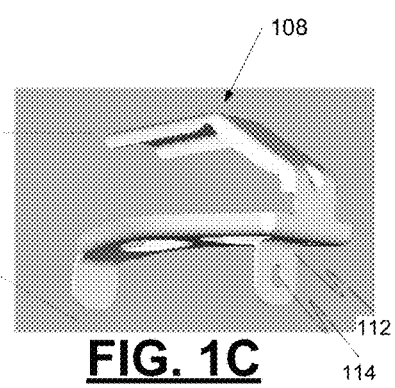
FIG. 1C is a diagram depicting an example assist handle bracket, in accordance with an embodiment.

FIG. 1C is a diagram depicting an example assist handle bracket 108. The example assist handle bracket 108 includes a tab 112 with an opening 114 within the tab 112 through which the fastener may enter to secure an assist handle bezel 106 to the example assist handle bracket 108.

Figure 1E:
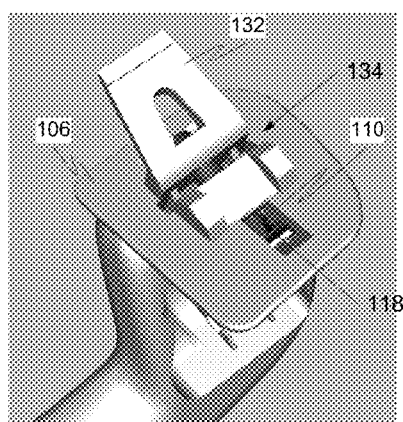
FIG. 1E is a diagram depicting the underside of an example assist handle bezel, in accordance with an embodiment.
Figure 1D:
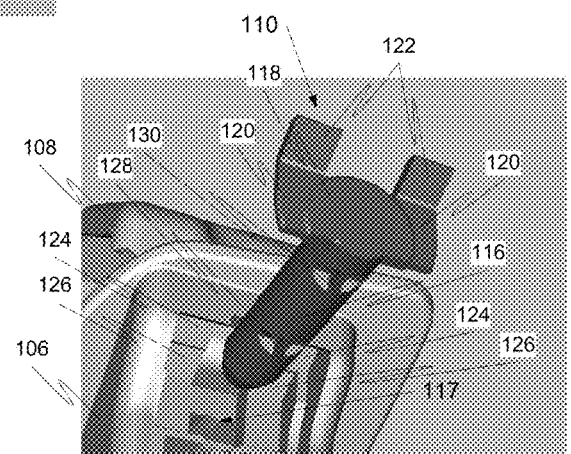
FIG. 1D is a diagram depicting an example fastener (e.g., push-pin) that may be used to secure an assist handle bezel to an assist handle bracket, in accordance with an embodiment.

FIG. 1D is a diagram depicting an example fastener 110 (e.g., push-pin) that may be used to secure an assist handle bezel 106 to an assist handle bracket 108. The example fastener 110 includes a cylindrical-like shaped body portion 116 that is shaped to move (e.g., slide) within a passageway 117 within the assist handle bezel 106 and the opening 114 within the tab 112 of the example assist handle bracket 108 to secure the example assist handle bezel 106 to the example assist handle bracket 108.

The example fastener 110 also includes a head portion 118 that extends laterally on one end of the cylindrical-like shaped body portion 116 with a width that is greater than the width of the cylindrical-like shaped body portion 116. The example head portion 118 includes a pair of arms 120 extending from end sections of the head portion 118. Each arm includes a hand 122 that is angled in a direction away from the lateral extending direction of the head portion 118 and is configured to function as a barrier to obscure the viewing of one or more viewing areas 124 in the example bezel 106 that are configured to display installation indicators (not shown). When the example fastener 110 is positioned in certain positions within the passageway of the example assist handle bezel 106, the hands 122 are positioned such that they at least partially obscure the viewing of installation indicators that may be provided in the viewing areas 124.

The example bezel 106 also includes a fastener installation resting area 126 into which the fastener head portion 118, arms 120, and hands 122 may be positioned when the fastener is in a fully installed position within the example bezel 106. When the fastener is positioned in a fully installed position within the example bezel 106, the hands 122 are positioned away from the viewing areas 124 such that they do not obscure the viewing of installation indicators that may be provided in the viewing areas 124.

The example fastener 110 also includes a pair of first recesses 128 and a pair of second recesses 130 within the cylindrical-like shaped body portion 116. The pair of first recesses 128 and second recesses 130 are configured to cooperate with locking tabs on the example bezel 106 to hold the example fastener 110 in a first position or a second position within the passageway 117. The first pair of recesses 128 and the first position may correspond with an installation stage for the example assist handle wherein the example handle may be moved into position to be attached to the bracket 108. The second pair of recesses 128 and the second position may correspond with an installation stage for the example assist handle wherein the example handle may be secured to the bracket 108.

FIG. 1E is a diagram depicting the underside of an example assist handle bezel 106. Illustrated is an example fastener 110 that has been positioned within a passageway in the example assist handle bezel 106. Also, illustrated is an example locking tab 132 that may cooperate with one or more first recesses 128 and/or one or more second recesses 130 to hold the example fastener 110 in a first position or a second position within the passageway 117. Additionally, illustrated is an opening 134 through which a holding structure (e.g., the tab 112) on the example assist handle bracket 108 can enter to engage the example fastener 110 when attaching the example assist handle to the example assist handle bracket.

Figure 2A:
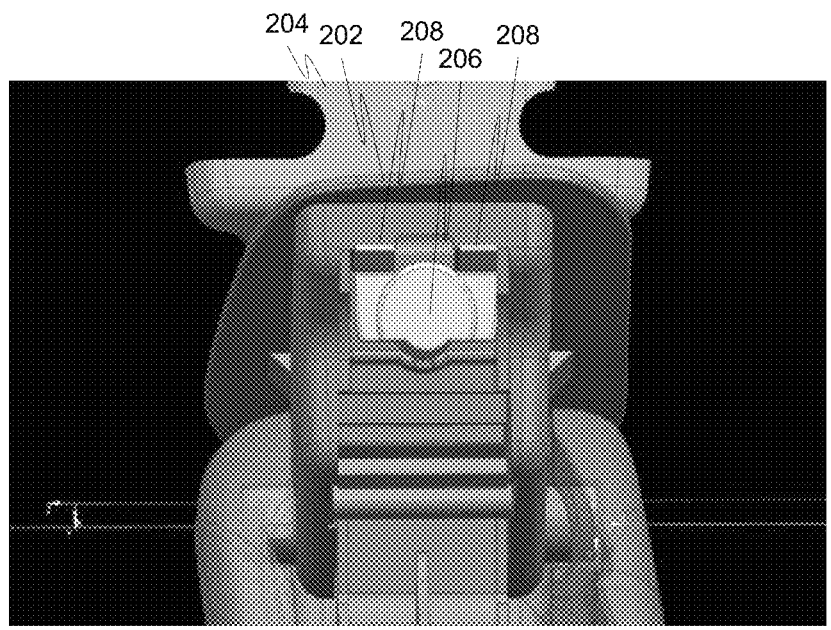
FIG. 2A is a diagram depicting an example assist handle bezel positioned to be attached to an example assist handle bracket and with a fastener in a first position, in accordance with an embodiment.

FIG. 2A is a diagram depicting an example assist handle bezel 202 positioned to be attached to an example assist handle bracket 204 and with a fastener 206 in a first position. In this example, due to the positioning of the example fastener 206 within the example assist handle bezel 202, example hands 208 of the example fastener 206 function as a barrier to obscure the viewing of one or more viewing areas (not shown) in the example bezel 202.

Figure 2B:
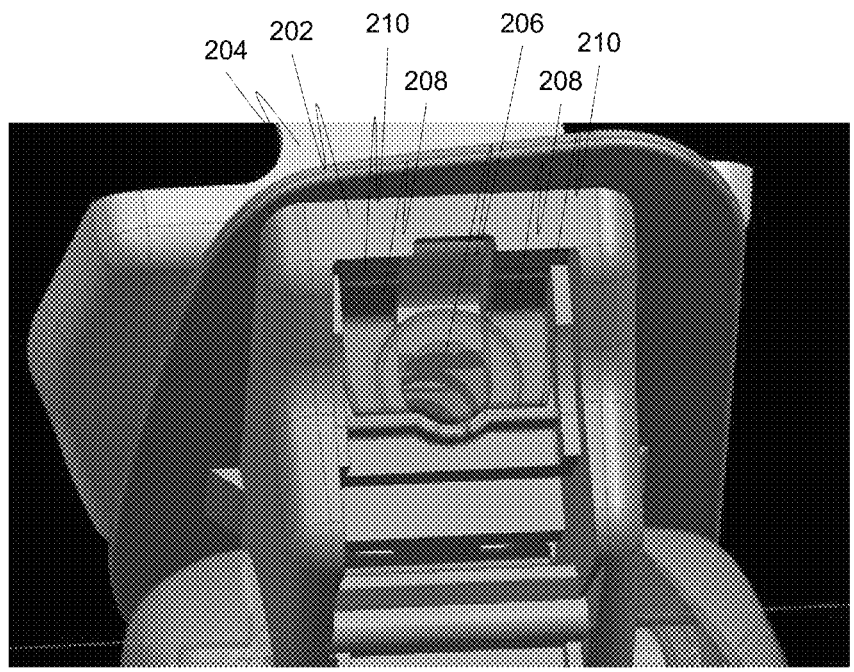
FIG. 2B is a diagram depicting the example assist handle bezel positioned to be attached to the example assist handle bracket and with the fastener in a second position that secures the example assist handle bezel to the example assist handle bracket, in accordance with an embodiment.

FIG. 2B is a diagram depicting the example assist handle bezel 202 positioned to be attached to the example assist handle bracket 204 and with the fastener 206 in a second position that secures the example assist handle bezel 202 to the example assist handle bracket 204. In this example, due to the positioning of the example fastener 206 within the example assist handle bezel 202, the example hands 208 of the example fastener 206 do not obscure the viewing of the viewing areas 210 in the example bezel 202. The viewing areas 210 function as an attachment detection window that provides an attachment detection indicator for indicating that the example assist handle bezel 202 has been properly attached to the example assist handle bracket 204. When the attachment detection indicator is visible (e.g., not obscured by the example hands) the attachment detection indicator indicates that the example assist handle bezel 202 has been properly installed. If the attachment detection indicator is not visible (e.g., obscured by the example hands 208) the example assist handle bezel 202 has not been properly installed. In this example, the attachment detection indicator is a color-coded indicator. The viewing of a particular color within the attachment detection window indicates that the example assist handle bezel 202 has been properly installed. In other examples, other attachment detection indicators may be used.

Figure 3A:
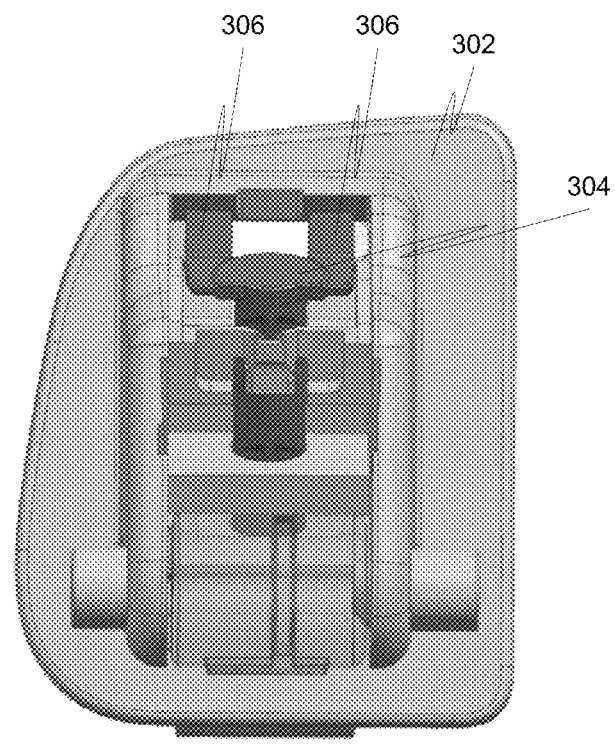
FIG. 3A is a diagram depicting an example assist handle bezel with a fastener in a first position, in accordance with an embodiment.

FIG. 3A is a diagram depicting an example assist handle bezel 302 with a fastener 304 in a first position. In this example, due to the positioning of the example fastener 304 within the example assist handle bezel 302, example hands 306 of the example fastener 304 function as a barrier to obscure the viewing of one or more viewing areas (not shown) in the example bezel 302.

Figure 3B:
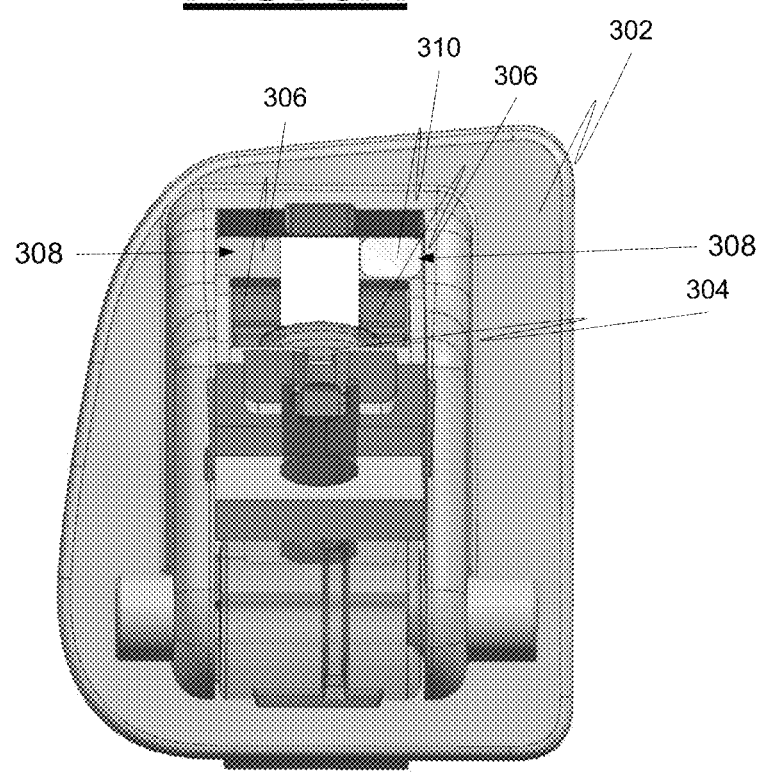
FIG. 3B is a diagram depicting the example assist handle bezel with the fastener in a second position that is configured to secure the example assist handle bezel to an example assist handle bracket, in accordance with an embodiment.

FIG. 3B is a diagram depicting the example assist handle bezel 302 with the fastener 304 in a second position that is configured to secure the example assist handle bezel 302 to an example assist handle bracket (not shown). In this example, due to the positioning of the example fastener 304 within the example assist handle bezel 302, the example hands 306 of the example fastener 304 do not obscure the viewing of the viewing areas 308 in the example bezel 302. The viewing areas 308 function as an attachment detection window that provides an attachment detection indicator 310 for indicating that the example assist handle bezel 302 has been properly attached to the example assist handle bracket (not shown). When the attachment detection indicator 310 is sufficiently visible (e.g., not obscured by the example hands) the attachment detection indicator 310 indicates that the example assist handle bezel 302 has been properly installed. If the attachment detection indicator 310 is not sufficiently visible (e.g., obscured by the example hands) the example assist handle bezel 302 has not been properly installed. In this example, the attachment detection indicator 310 includes a barcode. The proper reading of the barcode, for example by a laser barcode scanner, in the attachment detection window indicates that the example assist handle bezel 202 has been properly installed. In other examples, other attachment detection indicators may be used.

Figure 4:
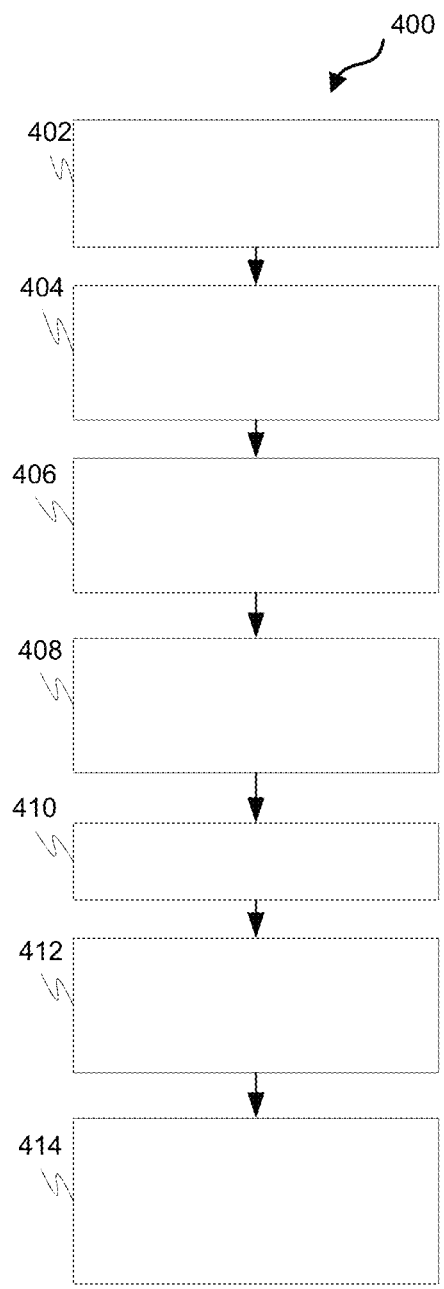
FIG. 4 is a process flow chart depicting an example process 400 for attaching a first device to a second device and detecting the proper attachment of the first device to the second device, in accordance with an embodiment.

FIG. 4 is a process flow chart depicting an example process 400 for attaching a first device to a second device and detecting the proper attachment of the first device to the second device.

An attachment structure with a fastener that is movable from a first position to a second position is provided (operation 402). The fastener may comprise a push-pin having a cylindrical-like shaped body and a head section extending laterally beyond the width of the body. The attachment structure may include a passageway through which the fastener may slide.

The first device is moved into position to be attached to a second device with the fastener in the first position (operation 404). The attachment structure may include a passageway through which the fastener may slide and an opening in the passageway through which a holding structure on the second device can enter to engage the fastener when attaching the first device to the second device. Moving the first device into position to be attached to the second device may comprise positioning the first device such that the holding structure on the second device fits within the opening in the passageway in the attachment structure through which the fastener may slide.

While the fastener is in the first position, an attachment detection window is obscured by a window barrier fixed to the fastener (operation 406). The window barrier may be fixed to a lateral edge of the head section of the fastener and may be angled away from the head section.

After the first device is moved into position to be attached to the second device, the first device is secured to the second device by sliding the fastener from the first position to the second position (operation 408). When the fastener is moved to the second position, the fastener may be locked into place (operation 410), for example by locking tabs that cooperate with features such as recesses on the fastener.

When the fastener is locked in the second position, the attachment detection window is revealed (operation 412). The attachment detection window may include an attachment detection indicator that includes a color-coded indicator. The attachment detection window may include an attachment detection indicator that includes a barcode.

When the attachment detection window has been revealed, the attachment detection window may be read to detect that the first device has been properly attached to the second device (operation 414). The attachment detection indicator may be read using a laser scanner.

Some or all of the operations of example process 400 may be performed using computer-controlled manufacturing equipment in a manufacturing environment such as using a robotic arm. Some or all of the operations may be directed by one or more processors executing computer programming instructions encoded in non-transient computer readable media.

Described herein are techniques for attaching one structure to another. The described techniques provide a fixation method that may provide an indication of proper assembly and allow for detection of proper assembly. The described techniques can provide a robust overhead assist handle attachment method that can be tied to line stop to provide for proper assembly positioning and installation. The described techniques may also be used for other attachment applications. The described techniques can provide an improved manufacturing assembly verification method for proper component installation. The described techniques can provide an assist handle attachment method whereby clips or threaded fasteners are not used. The described techniques may utilize a push-pin fastener that reveals a scannable feature when properly installed. The scannable feature (e.g., bar code, color, and others) can be electronically monitored during the assembly process and tied to controls (e.g. line stop) for proper installation.

In one embodiment, a method of attaching a first device to a second device is disclosed. The method comprises providing an attachment structure for attaching the first device to the second device that includes a fastener that is movable from a first position to a second position within the attachment structure, moving the first device into position to be attached to the second device with the fastener in the first position, obscuring an attachment detection window with a window barrier fixed to the fastener, securing the first device to the second device by sliding the fastener from the first position to the second position, locking the fastener in the second position, revealing the attachment detection window when the fastener is locked in the second position, and reading the attachment detection window to detect that the first device has been properly attached to the second device.

These aspects and other embodiments may include one or more of the following features. The attachment structure may include an opening through which a holding structure on the second device can enter to engage the fastener when attaching the first device to the second device. The attachment detection window may include a barcode or a color-coded indicator as an attachment detection indicator. Reading the attachment detection window may comprise reading an attachment detection indicator in the attachment detection window using a laser scanner. One or more of the retrieving, moving, sliding, and reading in the method may be performed using computer-controlled manufacturing equipment. The fastener may comprise a push-pin having a cylindrical-like shaped body and a head section extending laterally beyond the width of the body, and the window barrier may be fixed to a lateral edge of the head section and angled away from the head section. The attachment structure may include a passageway through which the fastener may slide and an opening in the passageway through which a holding structure on the second device can enter to engage the fastener when attaching the first device to the second device. Moving the first device into position to be attached to the second device may comprise positioning the first device such that a holding structure on the second device fits within an opening in a passageway in the attachment structure through which the fastener may slide.

In another embodiment, an attachment system for attaching a first device to a second device is provided. The attachment system comprises an attachment structure for attaching the first device to the second device, an attachment detection window in the attachment structure that includes an attachment detection indicator, a fastener that is slidably movable from a first position to a second position within the attachment structure, and a window barrier fixed to the fastener. The attachment system is configured to allow the first device to be moved into position to attach to the second device when the fastener is positioned in a first position. The attachment system is configured to attach the first device to the second device when the fastener is positioned in a second position. The window barrier obscures the attachment detection indicator when the fastener is not in the second position. The window barrier is positioned to not obscure the attachment detection indicator when the fastener is locked in the second position.

These aspects and other embodiments may include one or more of the following features. The system may further comprise a passageway within the attachment structure through which the fastener is slidably movable. The system may further comprise an opening in the passageway through which a holding structure on the second device can enter to engage the fastener when the first device is attached to the second device. The attachment detection indicator may comprise a barcode. The attachment detection indicator may comprise a color-coded indicator. The fastener may comprise a push-pin having a cylindrical-like shaped body and a head section extending laterally beyond the width of the body, and the window barrier may be fixed to a lateral edge of the head section and angled away from the head section.

In another embodiment, provided is an attachment structure in a vehicle for attaching a handle to an attachment bracket. The attachment structure comprises a bezel on an end of the handle that is rotatably attached to the handle and configured to mount the handle to the vehicle via a bracket, an attachment detection window in the bezel that includes an attachment detection indicator, a fastener that is slidably movable from a first position to a second position within the bezel, and a window barrier fixed to the fastener. The bezel is configured to allow the handle to be moved into position to attach to the bracket when the fastener is positioned in a first position. The bezel is configured to attach the handle to the bracket when the fastener is positioned in a second position. The window barrier obscures the attachment detection indicator when the fastener is not in the second position. The window barrier is positioned to not obscure the attachment detection indicator when the fastener is locked in the second position.

These aspects and other embodiments may include one or more of the following features. The attachment structure may further comprise a passageway within the bezel through which the fastener is slidably movable. The attachment structure may further comprise an opening in the passageway through which a holding structure on the bracket can enter to engage the fastener when the handle is attached to the bracket. The attachment detection indicator may comprise a barcode. The attachment detection indicator may comprise a color-coded indicator. The fastener may comprise a push-pin having a cylindrical-like shaped body and a head section extending laterally beyond the width of the body, and the window barrier may be fixed to a lateral edge of the head section and angled away from the head section.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method of attaching a first device to an attachment bracket in a vehicle, comprising:
   retrieving an attachment structure configured to attach the first device to the attachment bracket and a fastener that is movable from a first position to a second position within the attachment structure;
   rotatably attaching the attachment structure to an end of the first device;
   positioning the fastener in the first position within the attachment structure;
   moving the first device into position to be attached to the attachment bracket with the fastener in the first position, wherein a window barrier fixed to the fastener obscures an attachment detection window in the attachment structure that includes an attachment detection indicator;
   securing the first device to the attachment bracket by sliding the fastener from the first position to the second position within the attachment structure and locking the fastener in the second position, wherein the attachment detection window is revealed when the fastener is locked in the second position; and
   reading the attachment detection window to detect that the first device has been properly attached to the attachment bracket when the fastener is locked in the second position.

2. The method of claim 1 wherein the attachment structure includes an opening through which a holding structure on the attachment bracket can enter to engage the fastener when attaching the first device to the attachment bracket.

3. The method of claim 1, wherein the attachment detection window includes a barcode or a color-coded indicator as an attachment detection indicator.

4. The method of claim 1 wherein reading the attachment detection window comprises reading an attachment detection indicator in the attachment detection window using a laser scanner.

5. The method of claim 1, wherein one or more of the retrieving, moving, sliding, and reading are performed using computer-controlled manufacturing equipment.

6. The method of claim 1, wherein the fastener comprises a push-pin having a cylindrical shaped body and a head section extending laterally beyond the width of the body, and wherein the window barrier is fixed to a lateral edge of the head section and angled away from the head section.

7. The method of claim 1, wherein the attachment structure includes a passageway through which the fastener may slide and an opening in the passageway through which a holding structure on the attachment bracket can enter to engage the fastener when attaching the first device to the attachment bracket.

8. The method of claim 1, wherein moving the first device into position to be attached to the second device comprises positioning the first device such that a holding structure on the second device fits within an opening in a passageway in the attachment structure through which the fastener may slide.

9. An attachment system for attaching a first device to an attachment bracket, the attachment system comprising:
   an attachment structure on an end of the first device that is rotatably attached to the first device and configured to attach the first device to the attachment bracket;
   an attachment detection window in the attachment structure that includes an attachment detection indicator;
   a fastener that is slidably movable from a first position to a second position within the attachment structure; and
   a window barrier fixed to the fastener;
   wherein the attachment system is configured to allow the first device to be moved into position to attach to the attachment bracket when the fastener is positioned in a first position;
   wherein the attachment system is configured to attach the first device to the attachment bracket when the fastener is positioned in a second position;
   wherein the window barrier obscures the attachment detection indicator when the fastener is not in the second position; and
   wherein the window barrier is positioned to not obscure the attachment detection indicator when the fastener is locked in the second position.

10. The system of claim 9, wherein the attachment detection indicator comprises a barcode.

11. The system of claim 9, wherein the attachment detection indicator comprises a color-coded indicator.

12. The system of claim 9, wherein the fastener comprises a push-pin having a cylindrical shaped body and a head section extending laterally beyond the width of the body, and wherein the window barrier is fixed to a lateral edge of the head section and angled away from the head section.

13. The system of claim 9, further comprising a passageway within the attachment structure through which the fastener is slidably movable.

14. The system of claim 13, further comprising an opening in the passageway through which a holding structure on the attachment bracket can enter to engage the fastener when the first device is attached to the second device.

15. An attachment structure in a vehicle for attaching a handle to an attachment bracket, the attachment structure comprising:
   a bezel on an end of the handle that is rotatably attached to the handle and configured to mount the handle to the vehicle via a bracket;
   an attachment detection window in the bezel that includes an attachment detection indicator;
   a fastener that is slidably movable from a first position to a second position within the bezel; and
   a window barrier fixed to the fastener;
   wherein the bezel is configured to allow the handle to be moved into position to attach to the bracket when the fastener is positioned in a first position;
   wherein the bezel is configured to attach the handle to the bracket when the fastener is positioned in a second position;
   wherein the window barrier obscures the attachment detection indicator when the fastener is not in the second position; and
   wherein the window barrier is positioned to not obscure the attachment detection indicator when the fastener is locked in the second position.

16. The attachment structure of claim 15, wherein the attachment detection indicator comprises a barcode.

17. The attachment structure of claim 15, wherein the attachment detection indicator comprises a color-coded indicator.

18. The attachment structure of claim 15, wherein the fastener comprises a push-pin having a cylindrical shaped body and a head section extending laterally beyond the width of the body, and wherein the window barrier is fixed to a lateral edge of the head section and angled away from the head section.

19. The attachment structure of claim 15, further comprising a passageway within the bezel through which the fastener is slidably movable.

20. The attachment structure of claim 19, further comprising an opening in the passageway through which a holding structure on the bracket can enter to engage the fastener when the handle is attached to the bracket.

* * * * *